United States Patent [19]

Stahl

[11] Patent Number: 4,528,811
[45] Date of Patent: Jul. 16, 1985

[54] CLOSED-CYCLE GAS TURBINE CHEMICAL PROCESSOR

[75] Inventor: Charles R. Stahl, Scotia, N.Y.

[73] Assignee: General Electric Co., Schenectady, N.Y.

[21] Appl. No.: 500,815

[22] Filed: Jun. 3, 1983

[51] Int. Cl.³ .............................................. F02C 6/00
[52] U.S. Cl. .................................... 60/39.07; 60/39.52
[58] Field of Search ................. 60/39.02, 39.07, 39.41, 60/39.52

[56] References Cited

U.S. PATENT DOCUMENTS

| 2,646,633 | 7/1953 | Sedille .................................. 60/39.52 |
| 2,756,215 | 7/1956 | Burgess et al. ....................... 60/39.52 |
| 3,844,115 | 10/1974 | Lockwood ............................ 60/39.52 |
| 3,949,548 | 4/1976 | Lockwood ............................ 60/39.52 |

Primary Examiner—Louis J. Casaregola
Attorney, Agent, or Firm—J. C. Squillaro

[57] ABSTRACT

A closed-cycle gas turbine chemical processor separates the functions of combustion air and dilution fluid in a gas turbine combustor. The output of the turbine stage of the gas turbine is cooled and recirculated to its compressor from where a proportion is fed to a dilution portion of its combustor and the remainder is fed to a chemical recovery system wherein at least carbon dioxide is recovered therefrom. Fuel and combustion air are fed to a combustion portion of the gas turbine combustor. In a preferred embodiment of the invention, the gas turbine is employed to drive an electric generator. A heat recovery steam generator and a steam turbine may be provided to recover additional energy from the gas turbine exhaust. The steam turbine may be employed to also drive the electric generator. Additional heat may be added to the heat recovery steam generator for enhancing the electricity generated using heat recovery combustors in which the functions of combustion and dilution are separated. The chemical recovery system may employ process steam tapped from an intermediate stage of the steam turbine for stripping carbon dioxide from an absorbent liquid medium which is used to separate it from the gas stream fed to it. As the amount of carbon dioxide in the fuel fed to the chemical processor increases, the amount of process steam required to separate it from the absorbent fluid medium increases and the contribution to generated electricity by the steam turbine correspondingly decreases.

19 Claims, 6 Drawing Figures

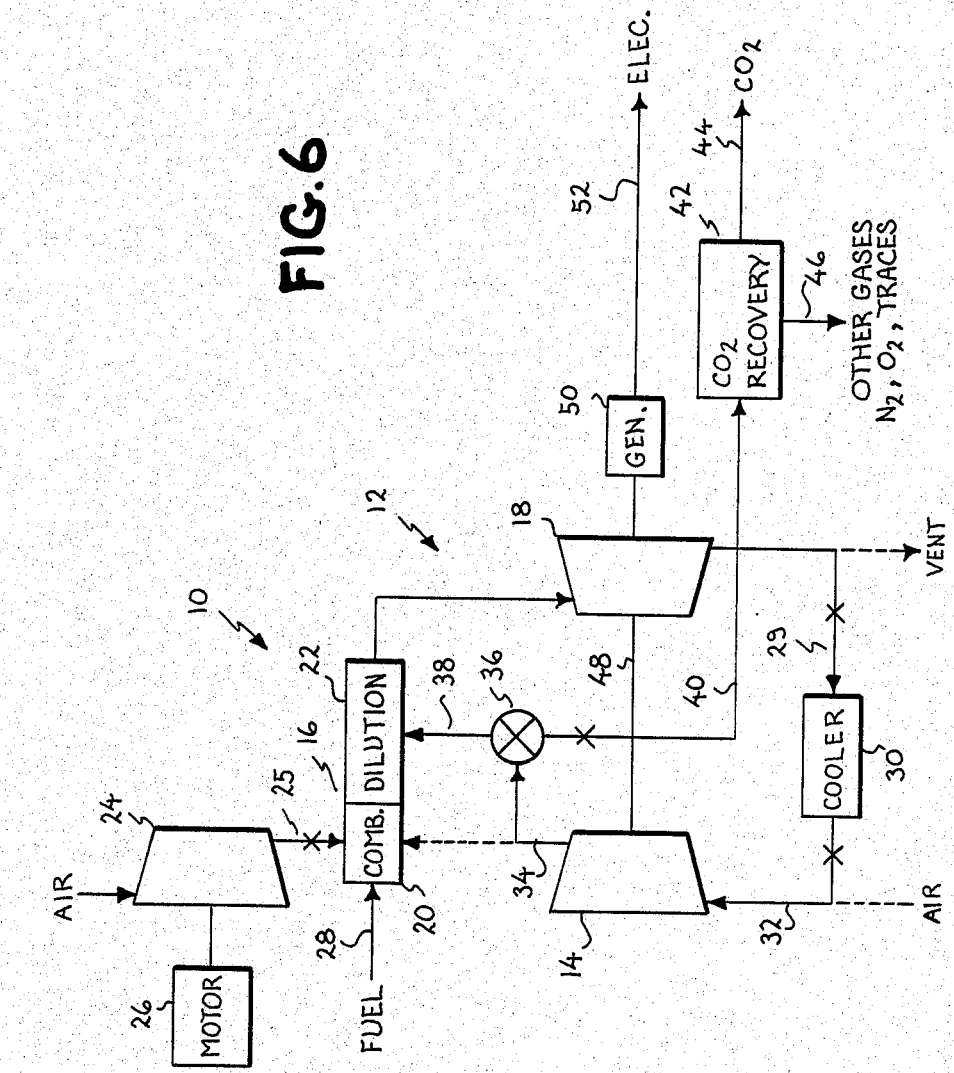

CLOSED-CYCLE GAS TURBINE CHEMICAL PROCESSOR

BACKGROUND OF THE INVENTION

The present invention relates to gas turbines and, more particularly, to gas turbines employed for chemical processing.

Gas turbines are well known for their use in the production of mechanical energy which may be applied to such tasks as vehicle propulsion or power generation. Gas turbines normally burn fuel in an open cycle in which air is compressed in a compressor, then heated by burning fuel in a combustor. The heated air and products of combustion are impinged on blades of one or more turbine wheels before being exhausted to the atmosphere. The turbine wheels are rotated by the energetic hot gases and the rotational energy is coupled to a load as well as back to the compressor.

In my prior U.S. patent application Ser. No. 263,316, filed May 13, 1981, I disclosed a closed-cycle gas turbine system in which pure oxygen, fed to the combustor together with fuel and recycled exhaust from the turbine, produces a relatively high percentage of carbon dioxide in this closed system. A part of the exhaust stream is bled off to maintain the internal inventory of materials constant in the closed system and the carbon dioxide in the bled off portion is recovered for chemical or industrial use. Excess energy from the gas turbine is employed to generate electric power as an economic output commodity. Heat from the gas turbine exhaust is recovered in a heat recovery steam generator to be used either for the generation of additional electric power or as an economic commodity itself.

One of the drawbacks of my above-referenced patent application is the need for a plant producing pure oxygen. Such an oxygen plant typically separates the two principal constituents in the air, namely oxygen and nitrogen, and delivers the oxygen to the gas turbine compressor. If the nitrogen is also recovered and sold or used, its value may at least partly justify the capital and operating expense of the oxygen plant. However, if the plant location is far from a market for nitrogen, as is often the case in such applications as oil field tertiary recovery, the capital and operating cost of the oxygen plant is a negative factor on the overall economic viability of the project.

One prior public use is known in which the compressor of an open-cycle gas turbine supplies a portion of its compressed air to a chemical process in which the oxygen in the air is removed and the remaining nitrogen is returned to a central portion of the combustor. The remainder of the compressed air from the compressor is fed to the combustor as combustion air in the vicinity of fuel injection and the nitrogen effluent of the chemical process is added to the combustion gas stream as cooling and dilution fluid downstream of the combustion area.

OBJECTS AND SUMMARY OF THE INVENTION

Accordingly, it is an object of the invention to provide a closed-cycle gas turbine chemical processor which overcomes the drawbacks of the prior art.

It is a further object of the invention to provide a closed-cycle chemical processor which is capable of performing its function using air for the combustion of fuel.

It is a further object of the invention to provide a closed-cycle chemical processor capable of proportioning its outputs of carbon dioxide and electricity according to the stage of oil recovery.

According to an embodiment of the invention, there is provided a closed-cycle chemical processor comprising a gas turbine including a compressor, a combustor and a turbine, means for coupling the turbine for driving the compressor and a load, means for splitting the combustor into a combustion portion and a dilution portion, means for feeding a fuel and a supply of pressurized air to the combustion portion, means for feeding an output of the compressor to the dilution portion, means for cooling a gaseous effluent of the turbine, means for feeding cooled effluent to the compressor, whereby a substantially closed system is provided, a chemical recovery system effective for recovering at least carbon dioxide from a gas stream fed to it, and means for feeding some of the output of the compressor to the chemical recovery system in an amount effective to maintain a substantially constant inventory of materials in the closed system.

According to a feature of the invention, there is provided, a tertiary oil recovery system for enhancing oil recovery from a recovery well comprising a gas turbine of the type having a compressor, a combustor and a turbine, means for coupling the turbine for driving the compressor and a load, means for splitting the combustor into a combustion portion and a dilution portion, means for feeding a fuel from the recovery well and a supply of pressurized air to the combustion portion, means for feeding an output of the compressor to the dilution portion, means for cooling a gaseous effluent of the turbine and for feeding cooled effluent to the compressor, whereby a substantially closed system is provided, a chemical recovery system effective for recovering at least carbon dioxide from a gas stream fed to it, means for feeding some of the output of the compressor to the chemical recovery system in an amount effective to maintain a substantially constant inventory of materials in the closed system, means for compressing the carbon dioxide for injection into an injection well spaced from the recovery well, and the means for feeding including a proportioning valve effective to control a proportion of the output of the compressor according to an amount of carbon dioxide in the fuel from the recovery well.

Briefly stated, the present invention provides a closed-cycle gas turbine chemical processor in which the functions of combustion air and dilution fluid in a gas turbine combustor are separated. Pressurized combustion air and fuel are fed to a combustion portion of the combustor. The output of the turbine stage of the gas turbine is cooled and recirculated to its compressor from whence a proportion is fed to a dilution portion of its combustor and the remainder is fed to a chemical recovery system wherein at least carbon dioxide is recovered therefrom. The carbon dioxide may be sold or used, for example, in tertiary oil recovery. In a preferred embodiment of the invention, the gas turbine is employed to drive an electric generator. In a more preferred embodiment of the invention, a heat recovery steam generator and a steam turbine are provided to recover additional energy from the gas turbine exhaust. The steam turbine may be employed to drive a load and is preferably employed to drive the electric generator.

Additional heat may be added to the heat recovery steam generator for enhancing the electricity generated. The additional heat is preferably produced using heat recovery combustors in which the functions of combustion and dilution are separated. The chemical recovery system may employ process steam tapped from an intermediate stage of the steam turbine for stripping carbon dioxide from an absorbent liquid medium which is used to separate it from the gas stream fed to it. As the amount of carbon dioxide in the fuel fed to the chemical processor increases, the amount of process steam required to separate it from the absorbent fluid medium increases and the contribution to generated electricity by the steam turbine correspondingly decreases.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 6 is a simplified schematic diagram of the invention showing the rerouting of materials used to convert the closed-cycle processor into an open-cycle gas turbine.

DETAILED DESCRIPTION OF THE PREFERRED EMBODIMENT

In my above-referenced prior application, it is necessary to use pure oxygen with the fuel and vitiated recycled gases fed to the combustor in order to obtain satisfactory combustion of the fuel. This also requires attention to the fact that the molecular weight of the hot gases passing to the turbine, being almost pure carbon dioxide, is much higher than the normal gases for which existing turbines are designed. One solution is to inject steam into the compressor or combustor to dilute the carbon dioxide with the steam which has a lower molecular weight than does the carbon dioxide. This solution suffers from the reduced thermodynamic efficiency produced by steam injection. Another solution is to run the gas turbine at a slower speed. This is inconvenient if electric power output from an electric generator being driven by the gas turbine is required to match the frequency of a power grid operating at, for example 60 Hz. That is, if the turbine is slowed to 3000 RPM, for example, gearing is necessary between it and the electric generator to effect drive of the electric generator at 3600 RPM.

The air normally fed to a gas turbine combustor has three functions, namely:
 burning the fuel
 cooling the combustor and its effluent
 working fluid for the turbine stage As a consequence, gas turbines are normally operated with about 300 percent excess air above the amount required to fully burn the fuel. The percentage of carbon dioxide in the combustor effluent is therefore relatively low. I have discovered that it is possible to separate the function of combustion from the remaining functions in a combustor so that combustion can be completed with about 10 percent excess air and the remaining functions can be performed by feeding vitiated recycled gases rich in carbon dioxide to the combustor downstream of a combustion zone.

Figure 1:
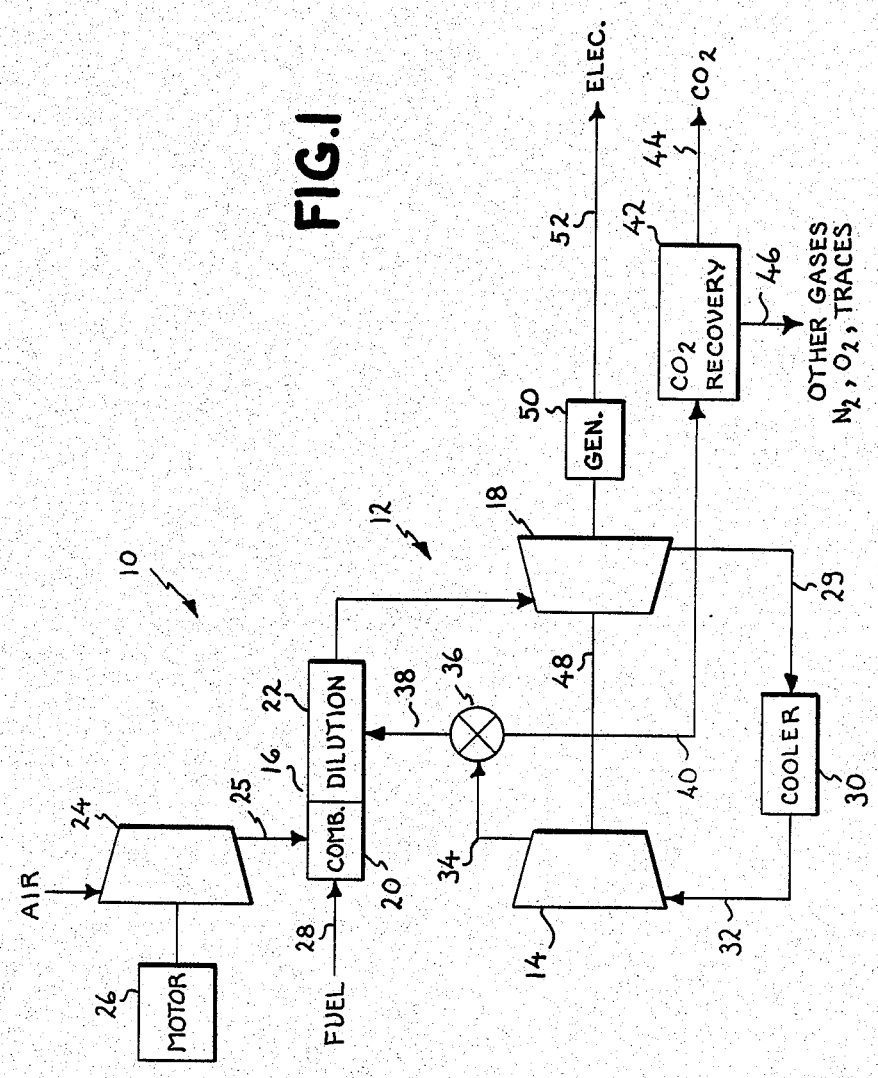
FIG. 1 is a simplified schematic diagram of a closed-cycle gas turbine chemical processor according to an embodiment of the present invention.

Referring now to FIG. 1, there is shown, generally at 10, a simplified schematic diagram of a closed-cycle gas turbine chemical processor according to the present invention. It should be noted that the basic principles of the invention are illustrated in FIG. 1 and that certain elements to be described hereinafter are desirably added to the simplified version to achieve higher energy and economic efficiency.

A gas turbine, shown generally at 12, includes a compressor 14, a combustor 16 and a turbine 18. Combustor 16 is divided into a combustion portion 20 and a dilution portion 22. An air compressor 24, driven by a motor 26, supplies pressurized combustion air on a conduit 25 to combustion portion 20 in an amount sufficient to burn a fuel fed thereto on a conduit 28 with as small an amount of excess air as necessary to provide substantially complete combustion of the fuel. Since very little excess air is used in combustion portion 20, its effluent is relatively rich in carbon dioxide.

The fuel may be of any convenient hydrocarbon type including, for example, liquid petroleum fuel, natural gas and gasified coal. Certain fuel cleanup operations may be necessary for removing contaminants from the fuel before it is fed to combustion portion 20. However, such fuel cleanup operations are conventional and do not form a part of the present invention. Further description thereof is therefore omitted.

The expanded gases from turbine 18 are returned on a conduit 29 to a cooler 30. Cooler 30 may include elements for improving the overall thermodynamic efficiency of the process as will be explained. The cooled gases from cooler 30 are applied on a conduit 32 to compressor 14 of gas turbine 12. The compressed gases from turbine 14 are applied on a conduit 34 to a proportioning valve 36. Proportioning valve 36 divides the gas flow into a first stream applied on a conduit 38 to dilution portion 22 of combustor 16 and a second stream applied on a conduit 40 to a carbon dioxide recovery system 42. Carbon dioxide recovery system 42 separates the carbon dioxide in its input from the other gases therein and outputs the carbon dioxide to a using or storage element (not shown) on a conduit 44 and the other gases to exhaust or further processing on a conduit 46.

As is conventional, some of the mechanical output of turbine 18 is fed back on a mechanical connection 48 to drive compressor 14. The remainder of the mechanical output is employed to drive an electric generator 50 some of whose output of electricity on a line 52 may be used in the chemical processor facility for uses such as, for example, in powering motor 26 and the remainder of whose output may be sold.

Figure 2:
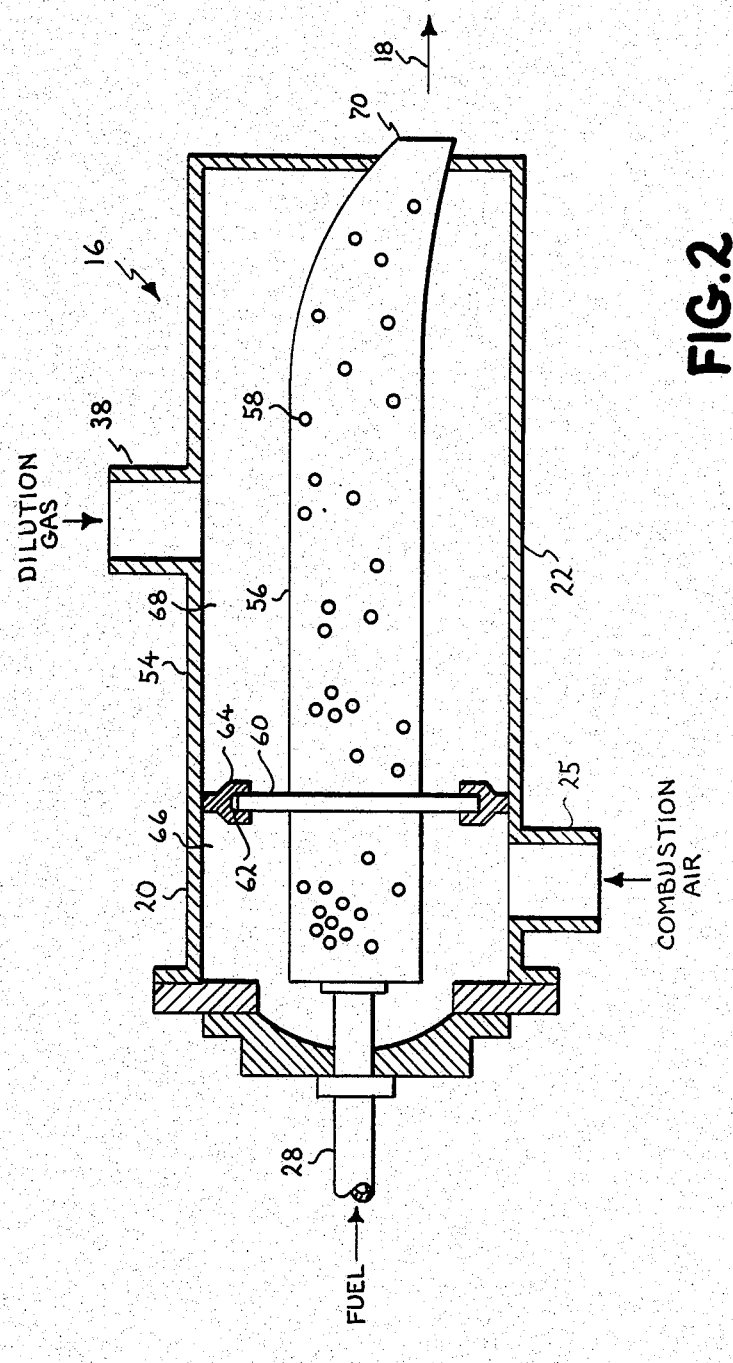
FIG. 2 is a cross section of a combustor of the chemical processor of FIG. 1.

Referring now to FIG. 2, combustor 16 is illustrated for concreteness as a can-type combustor having an outer casing 54 defining a plenum surrounding a combustor liner 56. Combustor liner 56 includes a plurality of openings 58 in its surface to admit gas from within outer casing 54 to the interior of combustor liner 56. Combustor liner 56 may also contain a generally conventional combustor liner (not shown) to help combustor 16 withstand the high temperatures generated by the combustion reaction within.

A collar 60 about combustor liner 56 mates with a groove 62 in an annular retainer 64 to divide the interior of the plenum within outer casing 54 into a combustion plenum 66 receiving combustion air on conduit 25 and a dilution plenum 68 receiving highly vitiated recirculated dilution gases having a high percentage of carbon dioxide on conduit 38. Fuel entering combustor 16 on conduit 28 is burned with air entering on conduit 25 generally within the portion of combustor liner 56 contained within combustion plenum 66. By properly establishing the length of combustion plenum 66 and the flow rates and pressures of fuel and combustion air, substantially complete combustion of the fuel can be achieved with only about 10 percent excess air. The remainder of combustor liner 56 located within dilution plenum 68 admits the highly vitiated gases within dilution plenum 68 both for cooling and for providing additional working fluid for turbine 18 to which the effluent of combustor 16 exists by way of an exit nozzle 70. The percentage of carbon dioxide on conduit 38 may be, for example, about 40 percent with the remainder of the gases being nitrogen, uncombusted oxygen and fuel along with trace chemicals and elements from the air and fuel.

Although only a single combustor 16 is shown in FIGS. 1 and 2, one skilled in the art would recognize that, for larger gas turbine, two or more combustors 16 may be employed. In a typical large gas turbine 12, a ring of, for example, twelve can-type combustors 16 may be arranged encircling the central portion of gas turbine 12. Since, except for the division of combustor 16 into a combustion portion 20 and a dilution portion 22 and the separate supply of combustion air and dilution gases thereto, combustor 16 is conventional, further detailed description thereof is omitted.

Figure 3:
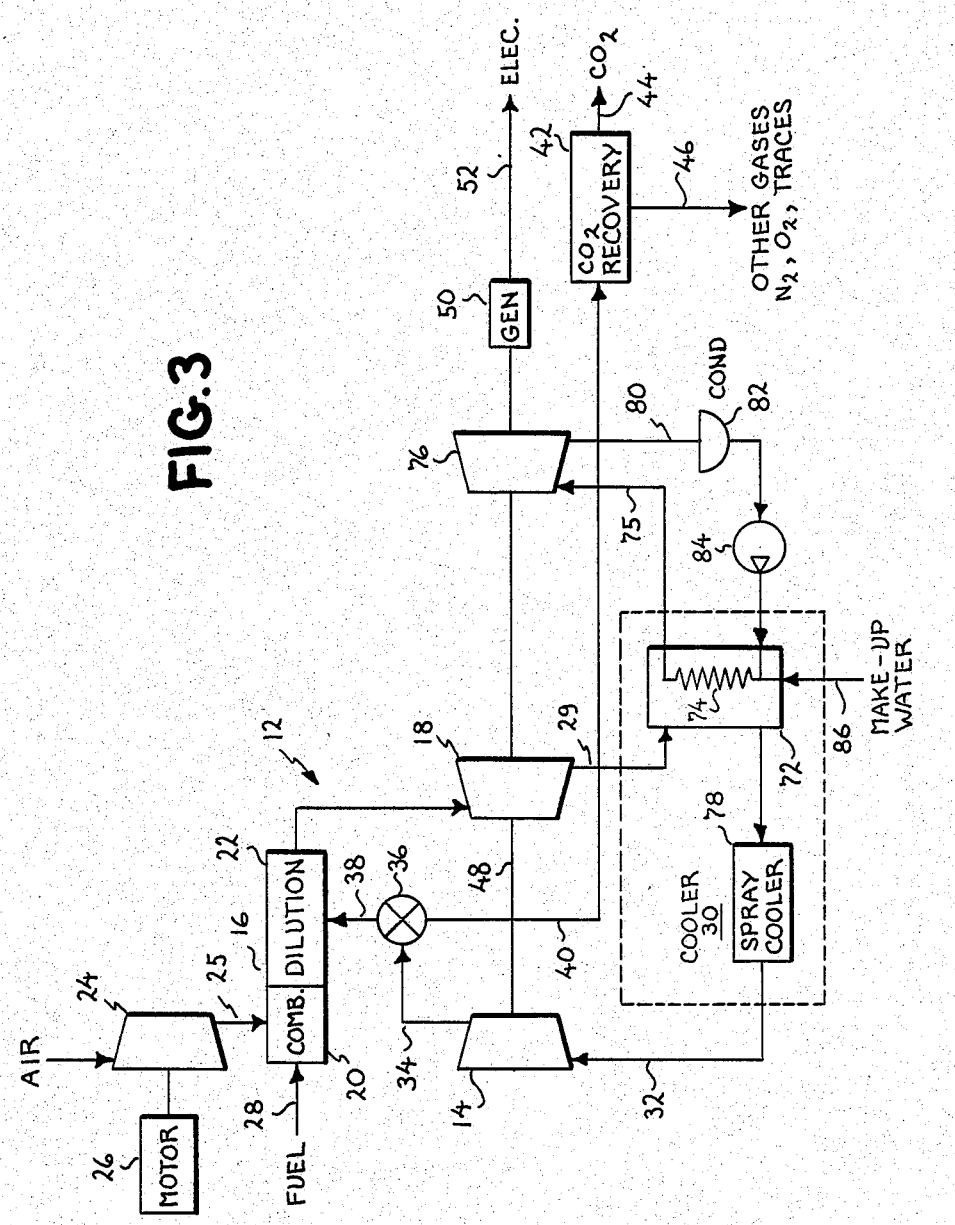
FIG. 3 is a more detailed schematic diagram of a closed-cycle gas turbine chemical processor according to an embodiment of the invention.

Referring now to FIG. 3, advantage is taken of the fact that the gases exiting turbine 18 on conduit 29 still contain a large amount of unrecovered thermal energy. That is, the gases in conduit 29 may be at about 1000 degrees F. and about 150 psia. Cooler 30 is seen to contain a heat recovery steam generator 72 through which these hot gases are passed. In their passage through heat recovery steam generator 72, these gases boil water in a coil 74 therein to produce superheated steam which is applied on a line 75 to a steam turbine 76. After exiting heat recovery steam generator 72, the gases may have their water condensed and may be further cooled in, for example, a spray cooler 78 before being returned on conduit 32 to compressor 14. Spent steam from steam turbine 76 is applied on a conduit 80 to a condenser 82 wherein the spent steam is condensed to water. The water from condenser 82 is pumped by a pump 84 to coil 74 in heat recovery steam generator 72 where it is again converted to steam and returned to steam turbine 76. Make-up water is added to the steam turbine system preferably to heat recovery steam generator 72 through a conduit 86.

Steam turbine 76 may be coupled to a common shaft with gas turbine 12 to provide additional drive to electric generator 50 as shown or, alternatively, may be coupled to a separate generator or other load (not shown). As a further alternative, steam turbine 76 may be omitted and steam from heat recovery steam generator 72 may be employed for its economic value in some other process.

Figure 4:
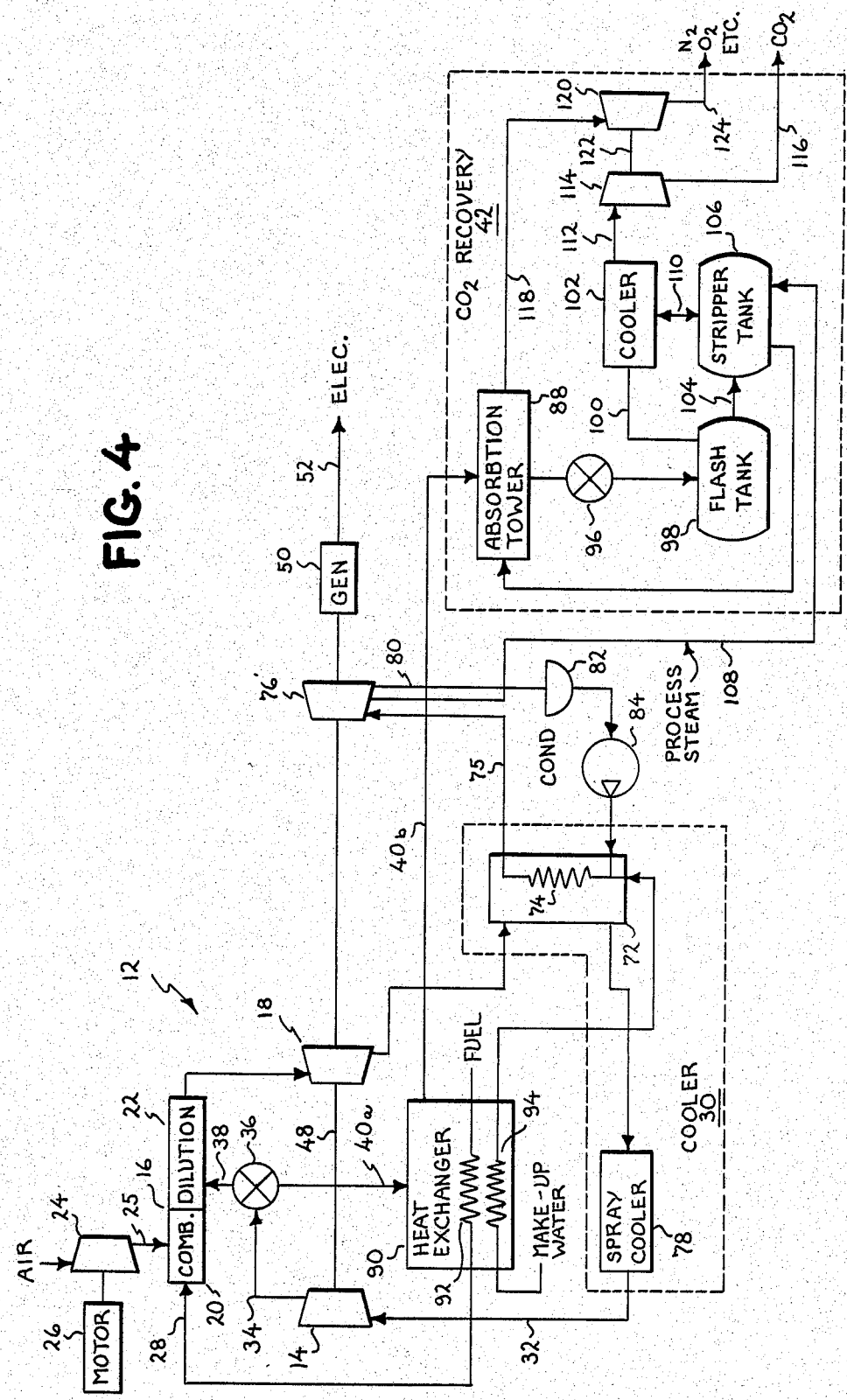
FIG. 4 is a schematic diagram of a further embodiment of the invention including additional details of a heat exchanger and a carbon dioxide recovery system.

Any convenient apparatus may be used in carbon dioxide recovery system 42 such as, for example, a cryogenic process. A cryogenic process is relatively wasteful of the thermal energy contained in the gas stream fed to it from proportioning valve 36. A preferred embodiment for carbon dioxide recovery system 42 is shown in FIG. 4. The gases are counter-flowed with an absorbent liquid medium in an absorption tower 88. The absorbent liquid medium may be of any convenient type capable of absorbing a substantial percentage such as, for example, 90 percent of the carbon dioxide in the gas stream. The remaining gases are vented or are delivered to a separation process not of concern to the present invention. One suitable absorbent liquid medium is a solution of potassium carbonate optionally including additional ingredients for preventing corrosion or for other purposes. In the preferred embodiment, a 40 percent solution of potassium carbonate delivered to absorption tower 88 at about 250 degrees F. is effective to absorb up to 95 percent of the carbon dioxide in the gas stream.

The hot gases leave proportioning valve 36 at about 600 degrees F. and about 160 psia. Before being delivered to absorption tower 88, they are cooled to about 250 degrees F. by passing them through a heat exchanger 90. Heat exchanger 90 may conveniently be employed as a recuperator or regenerator through a coil 92 of which a gaseous supply of fuel may be flowed on its way to combustor 16. By heating the fuel supply in heat exchanger 90, improved thermodynamic efficiency is obtained by reducing the amount of heat of combustion required to raise its temperature to the reaction temperature. In addition, the make-up water to heat recovery steam generator 72 may be passed through a coil 94 in heat exchanger 90 to preheat the make-up water for an additional improvement in efficiency.

The absorbent liquid medium leaves absorption tower 88 at about the same pressure with which it entered and with a temperature of about 283 degrees F., having had its temperature increased by about 33 degrees F. by heat of absorption of the carbon dioxide in its passages through absorption tower 88. The carbon dioxide laden absorbent liquid medium is passed through an expansion valve 96 wherein its pressure is rapidly reduced to a valve which is conductive to releasing the absorbed carbon dioxide. The reduced pressure produced by expansion valve 96 may be, for example, about 19.5 psia. The absorbent liquid medium is fed to a flash tank 98 wherein a substantial portion, such as, for example, about one-third of the absorbed carbon dioxide is flashed off due to the reduced pressure therein. The released carbon dioxide from flash tank 98 is fed on a conduit 100 to a conventional cooler 102 which uses, for example, water as a cooling medium wherein its temperature is reduced to about 100 degrees F. The remaining absorbent liquid medium, still containing about 65 percent of its original absorbed carbon dioxide is fed on a line 104 to a stripper tank 106.

A supply of low-pressure process steam is bled off from an intermediate stage of steam turbine 76' at, for example, about 50 psia and fed on a line 108 to stripper tank 106 wherein it heats the absorbent liquid medium therein to about 250 degrees F. to release all but a few percent of the carbon dioxide still contained therein. In one embodiment of the invention, the stripping operation in stripper tank 106 consumes about one pound of steam per 3.45 standard cubic feet of carbon dioxide recovered. More efficient absorbent liquid media or media permitting release of the absorbed carbon dioxide with reduced expenditure of steam may be, or may become available and use thereof should be considered within the scope of the present invention.

The recovered carbon dioxide from stripper tank 106 is fed on a line 110 to cooler 102. Cooler 102 cools the carbon dioxide to a saturated vapor at about 100 degrees F. The cooling water from cooler 102 is returned to stripper tank 106. Further processing of the carbon dioxide depends on the use contemplated for it. If the carbon dioxide is destined for use in tertiary oil recovery, for example, it is preferably compressed for injection into an oil well or for intermediate storage. For this use, the carbon dioxide is applied on a line 112 to a compressor 114 where it is compressed to, for example, about 2000 psia. Compressor 114 is preferably a multi-stage compressor of, for example, five stages with interstage cooling between stages. The interstage cooling reduces the moisture in the carbon dioxide delivered on an output line 116 to a value which is low enough that no additional drying may be required.

Power to drive compressor 114 may be provided by any convenient source such as, for example, a motor or a steam turbine supplied by steam from heat recovery steam generator 72 may be used. If this were done, the process steam required in stripper tank 106 may be obtained from an intermediate stage of the steam turbine. In the preferred embodiment shown in FIG. 4, advantage is taken of the fact that a substantial amount of unexpended energy is available in the unabsorbed gases, principally nitrogen and oxygen, from which the carbon dioxide has been removed in absorption tower 88. The energy in these gases, which are at about 156 psia and 250 degrees F., conveniently almost exactly matches the energy required to drive compressor 114. The unabsorbed gases are fed on a line 118 to an expansion turbine 120 which may be coupled to multi-stage compressor 114 by any convenient mechanical connection represented by a connection line 122. The effluent from expansion turbine 120 is discharged on a line 124 to an atmospheric vent or to a further separation and storage process not shown which is not of concern here and is therefore not further described.

The power available in the unabsorbed gases from absorption tower 88 may not exactly match the power requirements of multi-stage compressor 114. Under some circumstances, multi-stage compressor 114 requires less power than is available. In order to match the power required, a substantial portion of the unabsorbed gases must be vented without taking advantage of their energy. One way to add flexibility to the system is to employ expansion turbine in a way that either generates or substitutes for electricity and by driving multi-stage compressor 122 with an electric motor (not shown). For example, expansion turbine 120 may be coupled in tandem with motor 26 to aid in compressing air in air compressor 24. The electricity not used by motor 26 may be employed to power the motor driving multi-stage compressor 114 and any excess electricity may be sold or used.

When gas turbine chemical processor 10 is employed in tertiary oil recovery, the compressed carbon dioxide is injected into an injection well or a line of injection wells spaced from intended recovery wells. The carbon dioxide begins moving toward the recovery wells forcing the oil in the strata before it. Initially, the recovery wells do not exhibit any change in their oil output. After an initial period, which may endure for a period of a few weeks to a year or more, enhanced recovery of oil is experienced. During the initial period, the only opportunity for gaining a return on the capital investment in the system resides in the value of the electricity generated by electric generator 50. Thus, in the initial period, at least, an economic incentive exists for producing as much electricity as possible for sale or use. Electricity production competes with carbon dioxide production for steam from heat recovery steam generator 72. That is, the diversion of process steam from steam turbine 76' for use in the carbon dioxide recovery process in stripper tank 106 reduces the steam available to drive steam turbine 76' for generating electricity in generator 50.

Figure 5:
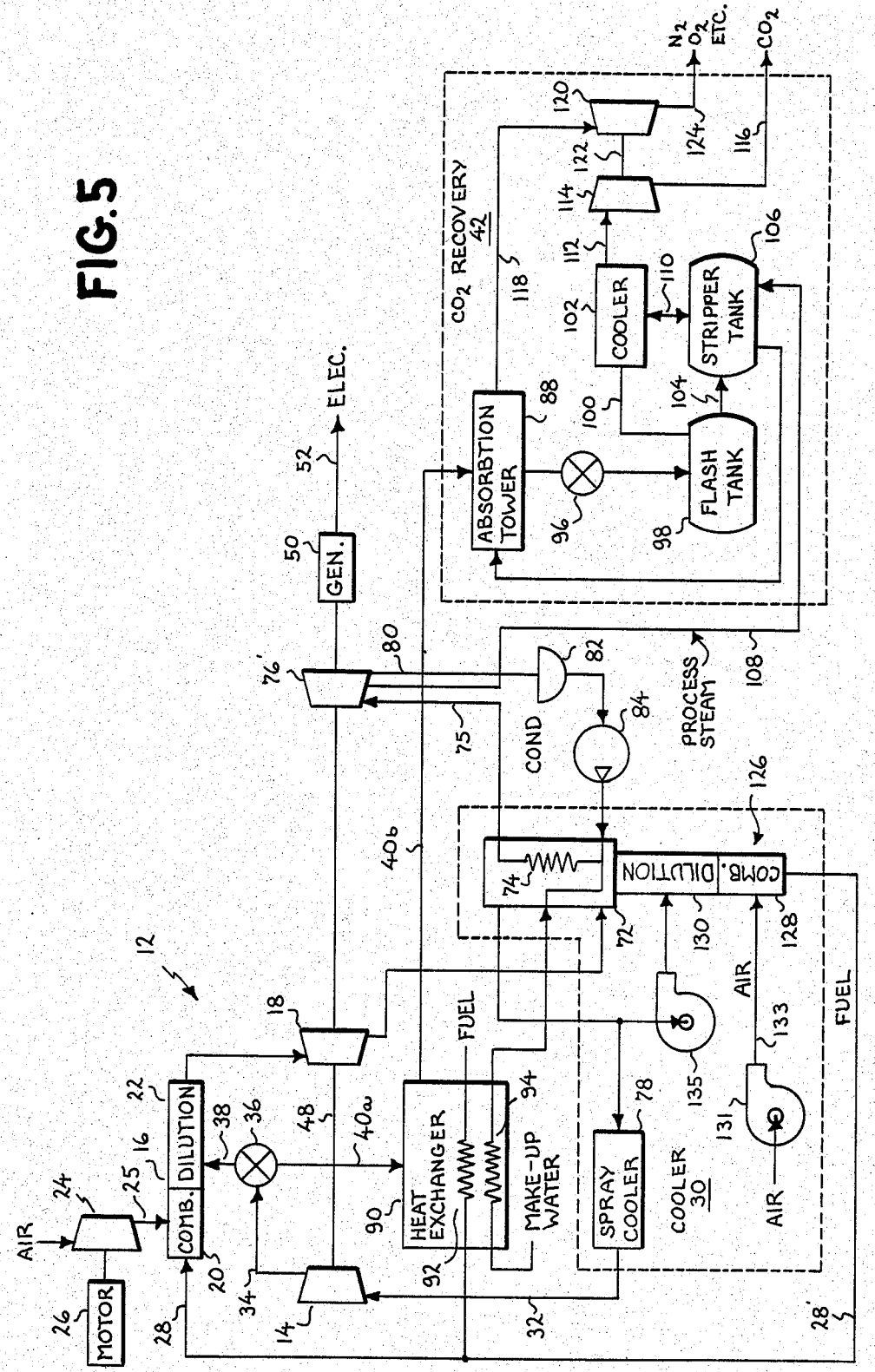
FIG. 5 is a schematic diagram of a still further embodiment of the invention employing a fired heat recovery steam generator for enhanced production of electricity.

In order to enhance the steam generation capability, and to also increase the generation of carbon dioxide, the embodiment of the invention shown in FIG. 5 employs a heat recovery combustor 126 for adding heat to heat recovery stream generator 72. For greatest efficiency, heat recovery combustor 126 may be divided into a combustion portion 128 and a dilution portion 130 functionally analogous to corresponding elements of combustor 16 in this and the foregoing embodiments. Combustion portion 128 receives fuel on a branch conduit 28' and combustion air pressurized by a blower 131 on a conduit 133. Cooling and dilution of the combustion products from combustion portion 128 is accomplished by injecting a portion of the recirculating carbon dioxide rich gas from heat recovery steam generator 72, optionally aided by a blower 135, into dilution portion 130. When the carbon dioxide rich effluent from heat recovery combustor 126 has expended its heat energy in enhancing the production of additional steam in heat recovery steam generator 72, it joins the recirculating gases fed to spray cooler 78 and thus remains in the system.

In some applications, heat recovery combustor 126 may employ a more conventional system in which only air and fuel are fed thereto for both combustion and dilution without the use of vitiated recirculated gases.

Although only a single heat recovery combustor 126 is shown in FIG. 5, it would be clear to one skilled in the art that additional heat may be produced by a plurality of heat recovery combustors 126 for use in large systems.

Later in the recovery process, oil production in the recovery wells is enhanced by the carbon dioxide being fed into the injection wells. Eventually some of the carbon dioxide completes the circuit to appear in the recovery wells. When the fuel used by gas turbine chemical processor 10 is a natural gas obtained from the recovery wells, the fuel fed to combustion portions 20 and 128 begins to exhibit increasing proportions of carbon dioxide. Since the effluent from combustion portions 20 and 128 now contains an increased proportion of carbon dioxide, the amount of carbon dioxide which must be injected into dilution portions 22 and 130 decreases. Proportioning valve 36 may therefore be actuated to reduce the amount of recirculating gases being fed to dilution portions 22 and 130 and to increase the amount being fed to carbon dioxide recovery system 42. The increased quantity of carbon dioxide which must be recovered in this later stage, of course, places increased demands for process steam for use in stripper tank 106 on the steam from heat recovery steam generator 72 fed to steam turbine 76'. In order to satisfy the need for additional steam, the amount of steam completing its expansion to atmospheric pressure on conduit 80 is proportionately reduced. This proportionately reduces the total output power which may be produced by generator 50. At this later stage in the tertiary oil recovery process, the reduced value of electricity being generated may be more than compensated by the additional oil and carbon dioxide produced so that this stage may represent a time of peak return on investment.

The economic value of electricity and chemical output of the apparatus of the invention may vary from time to time such that the potential for electric generation may outweigh the value of chemical products. It would be clear to one skilled in the art, in the light of the foregoing disclosure, that the production of chemical products consumes energy and thereby reduces the electricity which may be generated. In order to maximize production of electricity, any of the embodiments described herein may be selectively operated as an open system provided environmental constraints permit. For example, the embodiment of FIG. 1 may be converted to an open system by making the modifications shown in FIG. 6 wherein X indicates blockage of indicated conduits and dashed lines indicate new connections. It would be clear that provision for such reconfiguration of the system may be accomplished using standard valves provided for such purpose. Since one skilled in the art would not require a complete recitation of conventional valve hardware to accomplish the selectable connections of FIGS. 1 and 6, no such recitation will be given. In embodiments including a heat recovery steam generator, venting is preferably performed downstream of the heat recovery steam generator so that advantage can be taken of the energy remaining in the effluent of the gas turbine.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A closed-cycle chemical processor comprising:
   a gas turbine including a compressor, a combustor and a turbine;
   means for coupling said turbine for driving said compressor and a load;
   means for splitting said combustor into a combustion portion and a dilution portion;
   means for feeding a fuel and a supply of pressurized air to said combustion portion;
   means for feeding an output of said compressor to said dilution portion;
   means for cooling a gaseous effluent of said turbine and for feeding cooled effluent to said compressor, whereby a substantially closed system is provided;
   a chemical recovery system effective for recovering at least carbon dioxide from a gas stream fed to it; and
   means for feeding some of said output of said compressor to said chemical recovery system in an amount effective to maintain a substantially constant inventory of materials in said closed system.

2. A closed-cycle chemical processor according to claim 1 wherein said means for supplying air includes an air compressor.

3. A closed-cycle chemical processor according to claim 2 wherein said means for splitting said combustor includes a combustor liner, said combustor liner including a plurality of openings therein for permitting the entry of a gas therein, a plenum surrounding said combustor liner, means for separating a region between said combustor liner and said plenum into a combustion plenum and a dilution plenum, means for separately feeding said supply of pressurized air to said combustion plenum and said output of said compressor to said dilution plenum whereby the functions of combustion air and dilution gas are separated.

4. A closed-cycle chemical processor according to claim 1 wherein said means for feeding some of said output to said chemical recovery plant includes a proportioning valve, said proportioning valve being effective to vary a proportion of said outlet of said compressor being fed to said dilution portion and said chemical recovery plant.

5. A closed-cycle chemical processor according to claim 1 wherein said load is an electric generator.

6. A closed-cycle chemical processor according to claim 1 wherein said means for cooling includes a heat recovery steam generator, said heat recovery steam generator being effective to produce steam, and said system further includes a steam turbine driven by steam from said heat recovery steam generator.

7. A closed-cycle chemical processor according to claim 6 wherein said load includes an electric generator, and said means for coupling further includes means for coupling an output of said steam turbine to said electric generator for concerted drive with said gas turbine.

8. A closed-cycle chemical processor according to claim 1 wherein said means for feeding a fuel includes a heat exchanger, said heat exchanger including means effective to transfer heat from a gas in said closed system to said fuel.

9. A closed-cycle chemical processor according to claim 8 wherein said means for cooling includes a heat recovery steam generator, said heat recovery steam generator being effective to produce steam, and said system further includes a steam turbine driven by steam from said heat recovery steam generator.

10. A closed-cycle chemical processor according to claim 9 wherein said heat exchanger further includes means effective to transfer heat from said gas in said closed system to a make-up water for said heat recovery steam generator.

11. A closed-cycle chemical processor according to claim 9 wherein said heat recovery steam generator includes at least one heat recovery combustor effective for adding heat to said steam.

12. A closed-cycle chemical processor according to claim 11 wherein said heat recovery combustor includes means for splitting said heat recovery combustor into a combustion portion and a dilution portion, means for feeding a supply of fuel and pressurized air to said combustion portion, means for feeding said output of said compressor to said dilution portion, and means for adding an effluent from said heat recovery combustor to gases in said closed system.

13. A closed-cycle chemical processor according to claim 1 wherein said chemical recovery system includes an absorption tower, and absorption tower including means for absorbing carbon dioxide from said output of said compressor in an absorbent liquid medium, a flash tank including means for reducing a pressure on said absorbing liquid medium whereby a substantial portion of said carbon dioxide is released, and means for compressing said carbon dioxide released in said flash tank.

14. A closed-cycle chemical processor according to claim 13 wherein said means for cooling includes a heat recovery steam generator, said heat recovery steam generator being effective to produce steam, said system further includes a steam turbine driven by steam from said heat recovery steam generator, said chemical recovery system further includes a stripper tank effective to recover additional carbon dioxide from said absorbent liquid medium, said steam turbine includes means for providing a flow of low-pressure process steam to said stripper tank.

15. A closed-cycle chemical processor according to claim 1 wherein said fuel is a hydrocarbon gaseous fuel from an oil well.

16. A closed-cycle chemical processor according to claim 1 wherein said hydrocarbon gaseous fuel contains a substantial amount of carbon dioxide.

17. A closed-cycle chemical processor according to claim 1 wherein said fuel is a liquid petroleum.

18. A closed-cycle chemical processor according to claim 1 wherein said fuel is a gasified solid hydrocarbon fuel.

19. A closed-cycle chemical processor according to claim 1 wherein said load is an electric generator and said chemical processor further includes means for selectively operating said gas turbine as an open cycle gas turbine for maximizing electricity production.

* * * * *